(12) United States Patent
Sullivan et al.

(10) Patent No.: US 9,707,453 B2
(45) Date of Patent: Jul. 18, 2017

(54) GOLF BALL COMPOSITIONS

(71) Applicant: Acushnet Company, Fairhaven, MA (US)

(72) Inventors: Michael J. Sullivan, Old Lyme, CT (US); Mark L. Binette, Mattapoisett, MA (US); Brian Comeau, Berkley, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/811,913

(22) Filed: Jul. 29, 2015

(65) Prior Publication Data

US 2017/0028263 A1    Feb. 2, 2017

(51) Int. Cl.
| A63B 37/00 | (2006.01) |
| A63B 37/02 | (2006.01) |
| C08L 9/00 | (2006.01) |
| C08L 21/00 | (2006.01) |
| C08L 23/08 | (2006.01) |

(52) U.S. Cl.
CPC ...... *A63B 37/0073* (2013.01); *A63B 37/0024* (2013.01); *A63B 37/0035* (2013.01); *A63B 37/0039* (2013.01); *A63B 37/0047* (2013.01); *A63B 37/0059* (2013.01); *A63B 37/0066* (2013.01); *C08L 9/00* (2013.01); *C08L 21/00* (2013.01); *C08L 23/0876* (2013.01)

(58) Field of Classification Search
None
See application file for complete search history.

(56) References Cited

U.S. PATENT DOCUMENTS

| 3,421,766 | A | * | 1/1969 | Chmiel | A63B 37/0003 273/DIG. 10 |
| 4,266,772 | A | * | 5/1981 | Martin | A63B 37/0003 260/998.14 |
| 4,404,325 | A | * | 9/1983 | Mason | C08L 77/00 525/179 |
| 5,721,304 | A | * | 2/1998 | Pasqua, Jr. | A63B 37/0003 473/371 |
| 5,998,506 | A | * | 12/1999 | Nesbitt | A63B 37/0003 473/371 |
| 6,306,049 | B1 | * | 10/2001 | Rajagopalan | A63B 37/0003 428/421 |
| 6,613,843 | B2 | * | 9/2003 | Takesue | A63B 37/0003 473/373 |
| 6,919,395 | B2 | | 7/2005 | Rajagopalan et al. | |
| 8,686,084 | B2 | | 4/2014 | Wilson, III | |
| 2011/0143863 | A1 | * | 6/2011 | Sullivan | A63B 37/0043 473/376 |

OTHER PUBLICATIONS

DuPont Surlyn 9320 Product Data Sheet; Nov. 2014; pp. 1-3.*
DuPont Surlyn Product Information; 2000.*

* cited by examiner

*Primary Examiner* — David Buttner
(74) *Attorney, Agent, or Firm* — Mandi B. Milbank

(57) ABSTRACT

The present invention is directed to thermoset rubber compositions comprising from 1 phr to 20 phr of a zinc ionomer. The thermoset rubber composition is used to form at least one layer of a one-piece, two-piece, or multi-layer golf ball.

11 Claims, No Drawings

GOLF BALL COMPOSITIONS

FIELD OF THE INVENTION

The present invention relates to golf ball compositions, and, in particular, rubber golf ball compositions comprising zinc ionomers.

BACKGROUND OF THE INVENTION

Zinc ionomers are known to be activators for sulfur curable compositions. For example, U.S. Pat. No. 8,686,084 to Wilson discloses sulfur curable rubber compositions and cured articles based on the use of zinc activators for sulfur cure.

Zinc oxide is also known to improve the cure rate of rubber compositions, and is commonly added to golf ball compositions in a conventional powder form. Alternatives to conventional zinc oxide powder have been disclosed, for example, in U.S. Pat. No. 6,919,395 to Rajagopalan et al., which discloses golf ball compositions comprising zinc nanoparticles.

There remains a need in the industry for alternative methods of providing zinc activator to curable golf ball compositions. The present invention seeks to fulfill this need with golf ball compositions comprising zinc ionomers. Such compositions may provide one or more of the following benefits: less elemental zinc required for an equivalent state of cure, resulting in lower levels of zinc and zinc extractables than with zinc oxide; product design flexibility, including, for example, allowance for lower densities than with zinc oxide and replacement of zinc oxide with high specific gravity fillers; improved cure profile; and improved durability.

SUMMARY OF THE INVENTION

The present invention is directed to a golf ball comprising a layer formed from a thermoset rubber composition. The rubber composition comprises the reaction product of a base rubber, an initiator agent, a coagent, and from 1 phr to 20 phr of an ionomer composition. The reaction product is substantially free of zinc oxide, or comprises zinc oxide in an amount of up to 3 phr.

DETAILED DESCRIPTION OF THE INVENTION

Golf balls of the present invention include a layer comprising a thermoset rubber composition. Suitable thermoset rubber compositions comprise the reaction product of a base rubber, an initiator agent, a coagent, and an ionomer resin. The base rubber is selected from natural and synthetic rubbers, including, but not limited to, polybutadiene, polyisoprene, ethylene propylene rubber ("EPR"), ethylene propylene diene rubber ("EPDM"), styrene butadiene rubber, styrenic block copolymer rubber, butyl rubber, halobutyl rubber, copolymers of isobutylene and para-alkylstyrene, halogenated copolymers of isobutylene and para-alkylstyrene, acrylonitrile butadiene rubber, polychloroprene, alkyl acrylate rubber, chlorinated isoprene rubber, acrylonitrile chlorinated isoprene rubber, polystyrene elastomers, polyethylene elastomers, polyurethane elastomers, polyurea elastomers, metallocene-catalyzed elastomers and plastomers, polyalkenamer, phenol formaldehyde, melamine formaldehyde, polyepoxide, polysiloxane, alkyd, polyisocyanurate, polycyanurate, polyacrylate, and combinations of two or more thereof. Diene rubbers are preferred, particularly polybutadiene, styrene butadiene, acrylonitrile butadiene, and mixtures of polybutadiene with other elastomers wherein the amount of polybutadiene present greater than 40 wt % based on the total polymeric weight of the mixture.

Non-limiting examples of suitable commercially available base rubbers are Buna CB high-cis neodymium-catalyzed polybutadiene rubbers, such as Buna CB 23, Buna CB24, and Buna CB high-cis cobalt-catalyzed polybutadiene rubbers, such as Buna CB 1203, 1220 and 1221, commercially available from Lanxess Corporation; SE BR-1220, commercially available from The Dow Chemical Company; Europrene® NEOCIS® BR 40 and BR 60, commercially available from Polimeri Europa®; UBEPOL-BR® rubbers, commercially available from UBE Industries, Inc.; BR 01, commercially available from Japan Synthetic Rubber Co., Ltd.; Neodene high-cis neodymium-catalyzed polybutadiene rubbers, such as Neodene BR 40, commercially available from Karbochem; TP-301 transpolyisoprene, commercially available from Kuraray Co., Ltd.; Vestenamer® polyoctenamer, commercially available from Evonik Industries; Butyl 065 and Butyl 288 butyl rubbers, commercially available from ExxonMobil Chemical Company; Butyl 301 and Butyl 101-3, commercially available from Lanxess Corporation; Bromobutyl 2224 and Chlorobutyl 1066 halobutyl rubbers, commercially available from ExxonMobil Chemical Company; Bromobutyl X2 and Chlorobutyl 1240 halobutyl rubbers, commercially available from Lanxess Corporation; BromoButyl 2255 butyl rubber, commercially available from Japan Synthetic Rubber Co., Ltd.; Vistalon® 404 and Vistalon® 706 ethylene propylene rubbers, commercially available from ExxonMobil Chemical Company; Dutral CO 058 ethylene propylene rubber, commercially available from Polimeri Europa; Nordel® IP NDR 5565 and Nordel® IP 3670 ethylene-propylene-diene rubbers, commercially available from The Dow Chemical Company; EPT1045 and EPT1045 ethylene-propylene-diene rubbers, commercially available from Mitsui Corporation; Buna SE 1721 TE styrene-butadiene rubbers, commercially available from Lanxess Corporation; Afpol 1500 and Afpol 552 styrene-butadiene rubbers, commercially available from Karbochem; Plioflex PLF 1502, commercially available from Goodyear Chemical; Nipol® DN407 and Nipol® 1041L acrylonitrile butadiene rubbers, commercially available from Zeon Chemicals, L.P.; Neoprene GRT and Neoprene AD30 polychloroprene rubbers; Vamac® ethylene acrylic elastomers, commercially available from E. I. du Pont de Nemours and Company; Hytemp® AR12 and AR214 alkyl acrylate rubbers, commercially available from Zeon Chemicals, L.P.; Hypalon® chlorosulfonated polyethylene rubbers, commercially available from E. I. du Pont de Nemours and Company; and Goodyear Budene® 1207 polybutadiene, commercially available from Goodyear Chemical. In a particular embodiment, the core is formed from a rubber composition comprising as the base rubber a blend of Neodene BR 40 polybutadiene, Budene® 1207 polybutadiene, and Buna SB 1502 styrene butadiene rubber. In another particular embodiment, the core is formed from a rubber composition comprising as the base rubber a blend of Neodene BR 40 polybutadiene, Buna CB 1221, and core regrind.

The rubber is crosslinked using a peroxide or sulfur cure system. Suitable peroxide initiator agents include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; lauryl peroxide; benzoyl peroxide; and combinations thereof. Examples of suitable commercially available peroxides include, but are not limited to Perkadox® BC dicumyl peroxide, commercially available from Akzo Nobel, and Varox® peroxides, such as Varox® ANS benzoyl peroxide and Varox® 231 1,1-di(t-butylperoxy)3,3,5-trimethylcyclohexane, commercially available from RT Vanderbilt Company, Inc. Peroxide initiator agents are generally present in the rubber composition in an amount of at least 0.05 parts by weight per 100 parts of the base rubber, or an amount of 0.05 parts or 0.1 parts or 0.8 parts or 1 part or 1.25 parts or 1.5 parts or 2.5 parts or 3 parts or 3.5 parts or 5 parts or 6 parts or 10 parts or 15 parts by weight per 100 parts of the base rubber, or an amount within a range having a lower limit and an upper limit selected from these values.

Coagents are commonly used with peroxides to increase the state of cure. Suitable coagents include, but are not limited to, metal salts of unsaturated carboxylic acids; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, nickel, and sodium. In a particular embodiment, the coagent is selected from zinc salts of acrylates, diacrylates, methacrylates, dimethacrylates, and mixtures thereof. In another particular embodiment, the coagent is zinc diacrylate. The desired compression may be obtained by adjusting the amount of crosslinking, which can be achieved, for example, by altering the type and amount of coagent.

Suitable sulfur curing agents and accelerators include, but are not limited to sulfur; N-oxydiethylene 2-benzothiazole sulfenamide; N,N-di-ortho-tolylguanidine; bismuth dimethyldithiocarbamate; N-cyclohexyl 2-benzothiazole sulfenamide; N,N-diphenylguanidine; 4-morpholinyl-2-benzothiazole disulfide; dipentamethylenethiuram hexasulfide; thiuram disulfides; mercaptobenzothiazoles; sulfenamides; dithiocarbamates; thiuram sulfides; guanidines; thioureas; xanthates; dithiophosphates; aldehyde-amines; dibenzothiazyl disulfide; tetraethylthiuram disulfide; tetrabutylthiuram disulfide; and combinations thereof.

Preferred ionomers are salts of E/X/Y-type acid copolymers, wherein E is ethylene, X is an α,β-unsaturated carboxylic acid, and Y is an optional softening comonomer. The acid is preferably selected from methacrylic acid, acrylic acid, ethacrylic acid, maleic acid, crotonic acid, fumaric acid, and itaconic acid. Methacrylic acid and acrylic acid are particularly preferred. The acid is typically present in the acid copolymer in an amount of 6 wt % or greater, or 9 wt % or greater, or 10 wt % or greater, or 11 wt % or greater, or 15 wt % or greater, or 16 wt % or greater, or 19 wt % or greater, or 20 wt % or greater, or in an amount within a range having a lower limit of 1 or 4 or 6 or 8 or 10 or 11 or 12 or 15 wt % and an upper limit of 15 or 16 or 17 or 19 or 20 or 20.5 or 21 or 25 or 30 or 35 or 40 wt %, based on the total weight of the acid copolymer. The optional softening comonomer is preferably selected from (meth) acrylate and alkyl (meth) acrylates, wherein the alkyl groups have from 1 to 8 carbon atoms, including, but not limited to, n-butyl (meth) acrylate, isobutyl (meth) acrylate, methyl (meth) acrylate, and ethyl (meth) acrylate.

The acid copolymer is at least partially neutralized with a cation source, optionally in the presence of a high molecular weight organic acid, such as those disclosed in U.S. Pat. No. 6,756,436, the entire disclosure of which is hereby incorporated herein by reference. In a particular embodiment, at least 25% of the acid groups present in the ionomer resin are neutralized. In another particular embodiment, from 25% to 40% of the acid groups present in the ionomer resin are neutralized. In another particular embodiment, from 40% to 60% of the acid groups present in the ionomer resin are neutralized. In another particular embodiment, from 60% to 70% of the acid groups present in the ionomer resin are neutralized. In another particular embodiment, from 60% to 80% of the acid groups present in the ionomer resin are neutralized. In another particular embodiment, from 70% to 80% of the acid groups present in the ionomer resin are neutralized. In another embodiment, from 80% to 100% of the acid groups present in the ionomer resin are neutralized.

The cation source is selected from metal ions and compounds of zinc, and, optionally, one or more additional cation sources selected from metal ions and compounds of magnesium, sodium, potassium, cesium, calcium, barium, manganese, copper, tin, lithium, and rare earth metals.

It should be understood that suitable ionomer resins, which include partially neutralized acid copolymers and highly neutralized acid copolymers, also include ionomers formed from blends of two or more partially neutralized acid copolymers, ionomers formed from blends of two or more highly neutralized acid copolymers, and ionomers formed from blends of one or more partially neutralized acid copolymers with one or more highly neutralized acid copolymers. Suitable ionomer resins also include blends of one or more partially- or fully-neutralized polymers with less than 50 wt % of an additional polymer, such as a maleic anhydride-grafted metallocene-catalyzed polyethylene.

Examples of commercially available ionomers suitable for use in the present invention include, but are not limited to, Surlyn® ionomer resins, particularly Surlyn® 9910, Surlyn® 9320, Surlyn® 9945, Surlyn® 9970, Surlyn® 9120, Surlyn® 9150, Surlyn® 9650, and ionomeric materials sold under the trade names DuPont® HPF 1000, HPF 2000, HPF AD 1035, HPF AD 1040, all of which are commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.

Suitable ionomers are further disclosed, for example, in U.S. Patent Application Publication Nos. 2005/0049367, 2005/0148725, 2005/0020741, 2004/0220343, and 2003/0130434, and U.S. Pat. Nos. 5,587,430, 5,691,418, 5,866,658, 6,100,321, 6,562,906, 6,653,382, 6,756,436, 6,777,472, 6,762,246, 6,815,480, 6,894,098, 6,919,393, 6,953,820, 6,994,638, 7,375,151, and 7,652,086, the entire disclosures of which are hereby incorporated herein by reference.

In a particular embodiment, the ionomer is an E/X-type acid copolymer of ethylene (E) and an α,β-unsaturated carboxylic acid (X), wherein the acid is present in the acid copolymer in an amount of 16 wt % or greater, at least partially neutralized with a zinc cation. A non-limiting example of such ionomer is Surlyn® 9120 ethylene/methacrylic acid ionomer resin, commercially available from E. I. du Pont de Nemours and Company.

In another particular embodiment, the ionomer is an E/X/Y-type acid copolymer of ethylene (E), an α,β-unsaturated carboxylic acid (X), and an acrylate (Y) softening comonomer, wherein the copolymer is at least partially neutralized with a zinc cation and has a relatively low melting point. A non-limiting example of such ionomer is Surlyn® 9320 ethylene/methacrylic acid/n-butyl acrylate ionomer resin, commercially available from E. I. du Pont de Nemours and Company In another particular embodiment, the ionomer is a low molecular weight zinc ionomer, such AClyn® 293A, 295A, 290, and 291A low molecular weight ionomers, commercially available from Honeywell International Inc.

In another particular embodiment, the ionomer is an E/X/Y-type acid copolymer of ethylene (E), an α,β-unsaturated carboxylic acid (X), and optionally an acrylate softening comonomer (Y), wherein 70% or more of all acid groups present are neutralized with a zinc cation, and wherein the ionomer comprises from 5 parts to 100 parts of a zinc fatty acid salt, such as zinc stearate or zinc oleate.

The amount of ionomer used to form the rubber composition is 1 phr or 2 phr or 5 phr or 10 phr or 15 phr or 20 phr or 25 phr or an amount within a range having a lower limit and an upper limit selected from these values.

Zinc oxide is commonly used as a dual-functional filler/activator in rubber golf ball compositions. Typically, zinc oxide is used in an amount of 5 phr or greater. Rubber compositions of the present invention, however, are substantially free of zinc oxide or include zinc oxide in an amount of 3 phr or less. For purposes of the present invention, a golf ball composition is "substantially free of zinc oxide" if it does not contain zinc oxide or contains zinc oxide in an amount of less than 1 phr.

In a particular embodiment, the amount of elemental zinc present in the rubber composition, exclusive of zinc originating from zinc-containing coagent such as ZDA, is less than 0.7%.

Rubber compositions of the present invention optionally include one or more additives or fillers, including, but not limited to, soft and fast agent, weight adjusting filler, coagent (e.g., HVA coagent, commercially available from E. I. du Pont de Nemours and Company, and SR350 trimethylolpropane trimethacrylate, commercially available from Arkema Inc.) fatty acid or salt thereof, antioxidant, scorch retarder, coloring agent, chemical blowing or foaming agent, defoaming agent, stabilizer, softening agent, stiffening agent, impact modifier, free radical scavenger, and antiozonants.

Suitable types and amounts of base rubber, initiator agent, coagent, filler, and additives are more fully described in, for example, U.S. Pat. Nos. 6,566,483, 6,695,718, 6,939,907, 7,041,721 and 7,138,460, the entire disclosures of which are hereby incorporated herein by reference.

Golf Ball Applications

Rubber golf ball compositions according to the present invention can be used in a variety of constructions. For example, the compositions are suitable for use in one-piece, two-piece (i.e., a core and a cover), multi-layer (i.e., a core of one or more layers and a cover of one or more layers), and wound golf balls, having a variety of core structures, intermediate layers, covers, and coatings.

In golf balls of the present invention, at least one layer is formed from a rubber composition comprising the reaction product of a base rubber, an initiator agent, a coagent, and an ionomer resin. In golf balls having two or more layers comprising a rubber composition of the present invention, the inventive composition of one layer may be the same as or a different inventive composition than another layer. The layer(s) comprising a composition of the present invention can be any one or more of a core layer, an intermediate layer, or a cover layer.

Core Layer(s)

Cores of the golf balls formed according to the invention may be solid, semi-solid, hollow, fluid-, powder-, or gas-filled, and may be one-piece or multi-layered. Multilayer cores include a center, innermost portion, which may be solid, semi-solid, hollow, fluid-, powder-, or gas-filled, surrounded by at least one outer core layer. The outer core layer may be solid, or it may be a wound layer formed of a tensioned elastomeric material. For purposes of the present disclosure, the term "semi-solid" refers to a paste, a gel, or the like.

In a particular embodiment, the present invention provides a golf ball having an innermost core layer formed from a rubber composition of the present invention. In another particular embodiment, the present invention provides a golf ball having an outer core layer formed from a rubber composition of the present invention. In another particular embodiment, the present invention provides a golf ball having an intermediate core layer formed from a rubber composition of the present invention.

Golf ball cores of the present invention may include one or more layers formed from a suitable material other than a rubber composition of the present invention. Suitable core materials include, but are not limited to, thermoset materials, such as styrene butadiene rubber, polybutadiene, synthetic or natural polyisoprene, and trans-polyisoprene; thermoplastics, such as ionomer resins, polyamides and polyesters; and thermoplastic and thermoset polyurethane and polyureas.

Intermediate Layer(s)

When the golf ball of the present invention includes one or more intermediate layers, i.e., layer(s) disposed between the core and the cover of a golf ball, each intermediate layer can include any materials known to those of ordinary skill in the art including thermoplastic and thermosetting materials.

In one embodiment, the present invention provides a golf ball having one or more intermediate layers formed from a rubber composition of the present invention.

Also suitable for forming intermediate layer(s) are the compositions disclosed above for forming core layers.

A moisture vapor barrier layer is optionally employed between the core and the cover. Moisture vapor barrier layers are further disclosed, for example, in U.S. Pat. Nos. 6,632,147, 6,838,028, 6,932,720, 7,004,854, and 7,182,702, and U.S. Patent Application Publication Nos. 2003/0069082, 2003/0069085, 2003/0130062, 2004/0147344, 2004/0185963, 2006/0068938, 2006/0128505 and 2007/0129172, the entire disclosures of which are hereby incorporated herein by reference.

Cover

Golf ball covers of the present invention include single, dual, and multilayer covers. Dual and multilayer covers have an inner cover layer and an outer cover layer, and multilayer covers additionally have at least one intermediate cover layer disposed between the inner cover layer and the outer cover layer.

In a particular embodiment, the present invention provides a golf ball having an outermost cover layer formed from a rubber composition of the present invention. In another particular embodiment, the present invention provides a golf ball having an inner cover layer formed from a rubber composition of the present invention. In another particular embodiment, the present invention provides a golf ball having an intermediate cover layer formed from a rubber composition of the present invention.

Golf ball covers of the present invention may include one or more layers formed from a suitable material other than a rubber composition of the present invention. The cover material is preferably a tough, cut-resistant material, selected based on the desired performance characteristics. Suitable cover materials for the golf balls disclosed herein include, but are not limited to, polyurethanes, polyureas, and hybrids of polyurethane and polyurea; ionomer resins and blends thereof (e.g., Surlyn® ionomer resins and DuPont® HPF 1000 and HPF 2000 highly neutralized ionomers, commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyisoprene; polyoctenamer, such as Vestenamer® polyoctenamer, commercially available from Evonik Industries; polyethylene, including, for example, low density polyethylene, linear low density polyethylene, and high density polyethylene; polypropylene; rubber-toughened olefin polymers; non-ionomeric acid copolymers, e.g., ethylene (meth) acrylic acid; plastomers; flexomers; styrene/butadiene/styrene block copolymers; polybutadiene; styrene butadiene rubber; ethylene propylene rubber; ethylene propylene diene rubber; styrene/ethylene-butylene/styrene block copolymers; dynamically vulcanized elastomers; ethylene vinyl acetates; ethylene (meth)acrylates; polyvinyl chloride resins; polyamides, amide-ester elastomers, and copolymers of ionomer and polyamide, including, for example, Pebax® thermoplastic polyether and polyester amides, commercially available from Arkema Inc; crosslinked trans-polyisoprene and blends thereof; polyester-based thermoplastic elastomers, such as Hytrel® polyester elastomers, commercially available from E. I. du Pont de Nemours and Company, and Riteflex® polyester elastomers, commercially available from Ticona; polyurethane-based thermoplastic elastomers, such as Elastollan®, commercially available from BASF; synthetic or natural vulcanized rubber; and combinations thereof.

Polyurethanes, polyureas, and polyurethane-polyurea hybrids (i.e., blends and copolymers of polyurethanes and polyureas) are particularly suitable for forming cover layers of the present invention. Suitable polyurethanes and polyureas are further disclosed, for example, in U.S. Pat. Nos. 5,334,673, 5,484,870, 6,506,851, 6,756,436, 6,835,794, 6,867,279, 6,960,630, and 7,105,623; U.S. Patent Application Publication No. 2009/0011868; and U.S. Patent Application No. 60/401,047, the entire disclosures of which are hereby incorporated herein by reference. Suitable polyurethane-urea cover materials include polyurethane/polyurea blends and copolymers comprising urethane and urea segments, as disclosed in U.S. Patent Application Publication No. 2007/0117923, the entire disclosure of which is hereby incorporated herein by reference.

Compositions comprising an ionomer or a blend of two or more ionomers are also particularly suitable for forming cover layers. Preferred ionomeric cover compositions include:
(a) a composition comprising a "high acid ionomer" (i.e., having an acid content of greater than 16 wt %), such as Surlyn® 8150;
(b) a composition comprising a high acid ionomer and a maleic anhydride-grafted non-ionomeric polymer (e.g., Fusabond® functionalized polymers). A particularly preferred blend of high acid ionomer and maleic anhydride-grafted polymer is a 84 wt %/16 wt % blend of Surlyn® 8150 and Fusabond®. Blends of high acid ionomers with maleic anhydride-grafted polymers are further disclosed, for example, in U.S. Pat. Nos. 6,992,135 and 6,677,401, the entire disclosures of which are hereby incorporated herein by reference;
(c) a composition comprising a 50/45/5 blend of Surlyn® 8940/Surlyn® 9650/Nucrel® 960, preferably having a material hardness of from 80 to 85 Shore C;
(d) a composition comprising a 50/25/25 blend of Surlyn® 8940/Surlyn® 9650/Surlyn® 9910, preferably having a material hardness of about 90 Shore C;
(e) a composition comprising a 50/50 blend of Surlyn® 8940/Surlyn® 9650, preferably having a material hardness of about 86 Shore C;
(f) a composition comprising a blend of Surlyn® 7940/ Surlyn® 8940, optionally including a melt flow modifier;
(g) a composition comprising a blend of a first high acid ionomer and a second high acid ionomer, wherein the first high acid ionomer is neutralized with a different cation than the second high acid ionomer (e.g., 50/50 blend of Surlyn® 8150 and Surlyn® 9150), optionally including one or more melt flow modifiers such as an ionomer, ethylene-acid polymer or ester polymer; and
(h) a composition comprising a blend of a first high acid ionomer and a second high acid ionomer, wherein the first high acid ionomer is neutralized with a different cation than the second high acid ionomer, and from 0 to 10 wt % of an ethylene/acid/ester ionomer wherein the ethylene/acid/ester ionomer is neutralized with the same cation as either the first high acid ionomer or the second high acid ionomer or a different cation than the first and second high acid ionomers (e.g., a blend of 40-50 wt % Surlyn® 8150, 40-50 wt % Surlyn® 9120, and 0-10 wt % Surlyn® 6320).

Surlyn® 8150 and Surlyn® 8940 are different grades of E/MAA copolymer in which the acid groups have been partially neutralized with sodium ions. Surlyn® 9650, Surlyn® 9910, Surlyn® 9150, and Surlyn® 9120 are different grades of E/MAA copolymer in which the acid groups have been partially neutralized with zinc ions. Surlyn® 7940 is an E/MAA copolymer in which the acid groups have been partially neutralized with lithium ions. Surlyn® 6320 is a very low modulus magnesium ionomer with a medium acid content. Nucrel® 960 is an E/MAA copolymer resin nominally made with 15 wt % methacrylic acid. Surlyn® ionomers, Fusabond® polymers, and Nucrel® copolymers are commercially available from E. I. du Pont de Nemours and Company.

Ionomeric cover compositions can be blended with non-ionic thermoplastic resins, such as polyurethane, poly-etherester, poly-amide-ether, polyether-urea, thermoplastic polyether block amides (e.g., Pebax® polyether and polyester amides, commercially available from Arkema Inc.), styrene-butadiene-styrene block copolymers, styrene(ethylene-butylene)-styrene block copolymers, polyamides, polyesters, polyolefins (e.g., polyethylene, polypropylene, ethylene-propylene copolymers, polyethylene-(meth)acrylate, polyethylene-(meth)acrylic acid, functionalized polymers with maleic anhydride grafting, Fusabond® functionalized polymers commercially available from E. I. du Pont de Nemours and Company, functionalized polymers with epoxidation, elastomers (e.g., ethylene propylene diene monomer rubber, metallocene-catalyzed polyolefin) and ground powders of thermoset elastomers.

Ionomer golf ball cover compositions may include a flow modifier, such as, but not limited to, acid copolymer resins (e.g., Nucrel® acid copolymer resins, and particularly Nucrel® 960, commercially available from E. I. du Pont de Nemours and Company), performance additives (e.g., AC® performance additives, particularly AC® low molecular weight ionomers and copolymers, AC® oxidized polyethylenes, and AC® ethylene vinyl acetate waxes, commercially available from Honeywell International Inc.), fatty acid amides (e.g., ethylene bis-stearamide and ethylene bis-oleamide), fatty acids and salts thereof.

Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference.

Suitable cover materials and constructions also include, but are not limited to, those disclosed in U.S. Patent Application Publication No. 2005/0164810, U.S. Pat. Nos. 5,919,100, 6,117,025, 6,767,940, and 6,960,630, and PCT Publications WO00/23519 and WO00/29129, the entire disclosures of which are hereby incorporated herein by reference.

Component Dimensions

Dimensions of golf ball components, i.e., thickness and diameter, may vary depending on the desired properties. For the purposes of the invention, any layer thickness may be employed.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches.

Golf ball cores of the present invention include single, dual, and multilayer cores, and preferably have an overall diameter of 0.75 inches or 1.00 inch or 1.25 inches or 1.40 inches or 1.50 inches or 1.55 inches or 1.58 inches or 1.60 inches or 1.62 inches or 1.63 inches or 1.65 inches or an overall diameter within a range having a lower limit and an upper limit selected from these values. In a particular embodiment, the golf ball comprises a core and a cover, wherein the core is a solid, single layer having a diameter of 0.75 or 1.00 or 1.10 or 1.15 or 1.20 or 1.25 or 1.30 or 1.40 or 1.50 or 1.53 or 1.55 or 1.60 or 1.62 or 1.63 or 1.65 inches or a diameter within a range having a lower limit and an upper limit selected from these values. In another particular embodiment, the golf ball comprises a core and a cover, wherein the core comprises an inner core layer and an outer core layer, the inner core layer having a diameter of 0.50 or 0.75 or 0.90 or 0.95 or 1.00 or 1.10 or 1.20 or 1.25 or 1.40 or 1.55 or 1.57 or 1.58 inches or a diameter within a range having a lower limit and an upper limit selected from these values, and the outer core having a thickness of 0.020 or 0.025 or 0.032 or 0.050 or 0.100 or 0.200 or 0.250 or 0.310 or 0.440 or 0.500 or 0.560 or 0.800 inches or a thickness within a range having a lower limit and an upper limit selected from these values.

When present in a golf ball of the present invention, each intermediate layer has a thickness of 0.002 or 0.010 or 0.020 or 0.025 or 0.030 or 0.035 or 0.040 or 0.045 or 0.050 or 0.060 or 0.090 or 0.100 or 0.150 or 0.200 inches or a thickness within a range having a lower limit and an upper limit selected from these values. The total thickness of intermediate core layer(s) in golf balls of the present invention is preferably 0.020 or 0.0250 or 0.032 or 0.050 or 0.100 or 0.150 or 0.220 or 0.28 inches or is within a range having a lower limit and an upper limit selected from these values.

Golf ball covers of the present invention include single, dual, and multilayer covers, and preferably have an overall thickness of 0.01 inches or 0.02 inches or 0.025 inches or 0.03 inches or 0.04 inches or 0.045 inches or 0.05 inches or 0.06 inches or 0.07 inches or 0.075 inches or 0.08 inches or 0.09 inches or 0.1 inches or 0.15 inches or 0.2 inches or 0.3 inches or 0.5 inches or have an overall thickness within a range having an upper limit and a lower limit selected from these values. Dual and multilayer covers have an inner cover layer and an outer cover layer, and multilayer covers additionally have at least one intermediate cover layer disposed between the inner cover layer and the outer cover layer. In a particular embodiment, the cover is a single layer having a thickness of 0.020 or 0.025 or 0.030 or 0.040 or 0.045 or 0.050 or 0.070 or 0.100 or 0.120 or 0.150 or 0.350 or 0.400 or inches or a thickness within a range having a lower limit and an upper limit selected from these values. In another particular embodiment, the cover comprises an inner cover layer and an outer cover layer, the inner cover having a thickness within of 0.010 or 0.020 or 0.025 or 0.030 or 0.035 or 0.040 or 0.050 or 0.150 or 0.200 inches or a thickness within a range having a lower limit and an upper limit selected from these values, and the outer cover having a thickness of 0.010 or 0.020 or 0.025 or 0.030 or 0.035 or 0.040 or 0.050 inches or a thickness within a range having a lower limit and an upper limit selected from these values.

The golf balls of the present invention may be painted, coated, or surface treated for further benefits.

Properties

In a particular embodiment, golf ball layers formed from rubber compositions of the present invention have a specific gravity of less than 1.07 g/cm$^3$, or less than 1.05 g/cm$^3$, or less than 1.03 g/cm$^3$.

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising a layer formed from a thermoset rubber composition, wherein the thermoset rubber composition consists essentially of the reaction product of:
   a base rubber;
   a peroxide initiator agent;
   a coagent selected from the group consisting of metal salts of acrylates, diacrylates, methacrylates, and dimethacrylates, wherein the metal is selected from magnesium, calcium, zinc, aluminum, lithium, nickel, and sodium;
   from 1 phr to 15 phr of an E/X/Y-type ionomer composition of ethylene (E), an α,β-unsaturated carboxylic acid (X), and optionally a softening comonomer (Y), wherein at least 70% of all acid groups present in the ionomer composition are neutralized with a zinc cation;

from 0 phr to 1 phr of zinc oxide; and optionally a soft and fast agent selected from halogenated organosulfur compounds and metal salts thereof.

2. The golf ball of claim 1, wherein the amount of elemental zinc present in the thermoset rubber composition is less than 1 wt %, based on the total weight of the thermoset rubber composition.

3. The golf ball of claim 1, wherein the amount of elemental zinc present in the thermoset rubber composition is less than 0.7 wt %, based on the total weight of the thermoset rubber composition.

4. The golf ball of claim 1, wherein the coagent is selected from the group consisting of zinc salts of unsaturated carboxylic acids.

5. The golf ball of claim 4, wherein the amount of elemental zinc present in the thermoset rubber composition, excluding zinc present in the coagent, is less than 1 wt %, based on the total weight of the thermoset rubber composition.

6. The golf ball of claim 4, wherein the amount of elemental zinc present in the thermoset rubber composition, excluding zinc present in the coagent, is less than 0.7 wt %, based on the total weight of the thermoset rubber composition.

7. The golf ball of claim 1, wherein the ionomer composition has a melt index (190° C., 2.16 kg) of greater than 0.5 g/10 min.

8. The golf ball of claim 1, wherein the ionomer composition has a melt index (190° C., 2.16 kg) of 0.7 or greater.

9. The golf ball of claim 1, wherein the layer formed from the thermoset rubber composition has a specific gravity of less than 1.07 g/cm$^3$.

10. The golf ball of claim 1, wherein the layer formed from the thermoset rubber composition has a specific gravity of less than 1.05 g/cm$^3$.

11. The golf ball of claim 1, wherein the layer formed from the thermoset rubber composition has a specific gravity of less than 1.03 g/cm$^3$.

* * * * *